US006266666B1

(12) United States Patent
Ireland et al.

(10) Patent No.: US 6,266,666 B1
(45) Date of Patent: Jul. 24, 2001

(54) COMPONENT TRANSACTION SERVER FOR DEVELOPING AND DEPLOYING TRANSACTION- INTENSIVE BUSINESS APPLICATIONS

(75) Inventors: Evan Ireland, Walnut Creek; David W. Van Couvering, Berkeley, both of CA (US)

(73) Assignee: SYBASE, Inc., Emeryville, CA (US)

( * ) Notice: Subject to any disclaimer, the term of this patent is extended or adjusted under 35 U.S.C. 154(b) by 0 days.

(21) Appl. No.: 09/149,890

(22) Filed: Sep. 8, 1998

Related U.S. Application Data

(60) Provisional application No. 60/058,199, filed on Sep. 8, 1997, and provisional application No. 60/080,192, filed on Mar. 31, 1998.

(51) Int. Cl.[7] .................................................. G06F 17/30
(52) U.S. Cl. .............................................................. 707/10
(58) Field of Search ................................. 707/1–10, 102

(56) References Cited

U.S. PATENT DOCUMENTS

| 5,566,330 | * | 10/1996 | Sheffield | 395/600 |
| 5,687,317 | | 11/1997 | Hughes et al. | 395/200.03 |
| 5,706,349 | | 1/1998 | Aditham et al. | 380/49 |
| 5,757,925 | | 5/1998 | Faybishenko | 380/49 |
| 5,761,499 | * | 6/1998 | Sonderegger | 395/610 |
| 5,764,897 | * | 6/1998 | Khalidi | 395/200.31 |
| 5,774,668 | | 6/1998 | Choquier et al. | 395/200.53 |
| 5,778,182 | | 7/1998 | Cathey et al. | 395/200.49 |
| 5,857,191 | | 1/1999 | Blackwell, Jr. et al. | 707/3 |
| 5,951,694 | | 9/1999 | Choquier et al. | 714/15 |
| 5,956,489 | | 9/1999 | San Andres et al. | 395/200 |
| 5,956,714 | | 9/1999 | Condon | 707/8 |
| 6,085,030 | * | 7/2000 | Whitehead et al. | 395/200.33 |

\* cited by examiner

*Primary Examiner*—John Breene
*Assistant Examiner*—Susan Rayyan
(74) *Attorney, Agent, or Firm*—John A. Smart

(57) ABSTRACT

A Component Transaction Server (CTS) is described, which provides a framework for deploying the middle-tier logic of distributed component-based applications. The CTS simplifies the creation and administration of Internet applications that service thousands of simultaneous clients. The CTS components, which execute on the middle-tier between end-user client applications and remote databases, provide efficient management of client sessions, security, threads, third-tier database connections, and transaction flow, without requiring specialized knowledge on the part of the component developer. The system's scalability and platform independence allows one to develop application on inexpensive uniprocessor machines, then deploy the application on an enterprise-grade multiprocessor server. In its Result Set module, the CTS provides tabular result sets, thus making the environment very desirable for business applications. In most component-based systems, a component interface returns an object. CTS components can return either an object or a collection of objects called a "result set." The format of a result set is based on the standard ODBC result set, and it is roughly equivalent to a database cursor. Because they return a result set, CTS components are much simpler and more efficient to work with. In this fashion, graphic user interface (GUI) development with CTS is nearly identical to traditional two-tier systems.

35 Claims, 7 Drawing Sheets

COMPONENT TRANSACTION SERVER FOR DEVELOPING AND DEPLOYING TRANSACTION- INTENSIVE BUSINESS APPLICATIONS

RELATED APPLICATIONS

The present application claims the benefit of priority from and is related to the following commonly-owned U.S. provisional applications: application Ser. No. 60/058,199, entitled Component Transaction Server For Developing and Deploying Transaction-Intensive Business Applications, filed Sep. 23, 1997, and application Ser. No. 60/080,192, entitled Component Transaction Server for Developing and Deploying Transaction-Intensive Business Applications, filed Mar. 31, 1998. The disclosure of which is hereby incorporated by reference. The disclosures of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to distributed computing systems and, more particularly, to a system and methods for improving data access and operation in distributed computer environments.

Today, most computers are linked to other computer systems via a computer network. Well-known examples of computer networks include local-area networks (LANs) where the computers are geographically close together (e.g., in the same building), and wide-area networks (WANs) where the computers are farther apart and are connected by telephone lines or radio waves.

Often, networks are configured as "client/server" networks, such that each computer on the network is either a "client" or a "server." Servers are powerful computers or processes dedicated to managing shared resources, such as storage (i.e., disk drives), printers, modems, or the like. Servers are often dedicated, meaning that they perform no other tasks besides their server tasks. For instance, a database server is a computer system that manages database information, including processing database queries from various clients. The client part of this client-server architecture typically comprises PCs or workstations which rely on a server to perform some operations. Typically, a client runs a "client application" that relies on a server to perform some operations, such as returning particular database information.

Often, client-server architecture is thought of as a "two-tier architecture," one in which the user interface runs on the client or "front end" and the database is stored on the server or "back end." The actual business rules or application logic driving operation of the application can run on either the client or the server (or even be partitioned between the two). In a typical deployment of such a system, a client application, such as one created by an information service (IS) shop, resides on all of the client or end-user machines. Such client applications interact with host database engines (e.g., Sybase® SQL Server™), executing business logic which traditionally ran at the client machines.

More recently, the development model has shifted from standard client/server or two-tier development to a three-tier, component-based development model. This newer client/server architecture introduces three well-defined and separate processes, each typically running on a different platform. A "first tier" provides the user interface, which runs on the user's computer (i.e., the client). Next, a "second tier" provides the functional modules that actually process data. This middle tier typically runs on a server, often called an "application server." A "third tier" furnishes a database management system (DBMS) that stores the data required by the middle tier. This tier may run on a second server called the database server.

The three-tier design has many advantages over traditional two-tier or single-tier designs. For example, the added modularity makes it easier to modify or replace one tier without affecting the other tiers. Separating the application functions from the database functions makes it easier to implement load balancing. Thus, by partitioning applications cleanly into presentation, application logic, and data sections, the result will be enhanced scalability, reusability, security, and manageability.

In a typical client/server environment, the client knows about the database directly and can submit a database query for retrieving a result set which is generally returned as a tabular data set. In a three-tier environment, particularly a component-based one, the client never communicates directly with the database. Instead, the client typically communicates through one or more components. Components themselves are defined using one or more interfaces, where each interface is a collection of method. In general, components return information via output parameters. In the conventional, standard client/server development model, in contrast, information is often returned from databases in the form of tabular result sets, via a database interface such as Open Database Connectivity (ODBC). A typical three-tier environment would, for example, include a middle tier comprising business objects implementing business rules (logic) for a particular organization. The business objects, not the client, communicates with the database. Nevertheless, there is still the desire to have client/server features, such as scrollable results and data input fields.

Since existing tools were created for the client/server model, they are better suited or adapted to receiving table-based or tabular "result sets" for retrieving complex data. Also, tabular data tends to be a more efficient way to retrieve data from a relational database, such as from Sybase® SQL Server. At the same time, however, components provide distinct advantages. In particular, they provide a well-designed model and interface, so that reusable code is achievable with minimal effort.

One common mechanism for retrieving tabular data through component-based interfaces is to return output parameters in the form of arrays of structures, or arrays of objects. The approach is problematic, however. First, present-day automated development tools that allow a developer to rapidly build application programs are tied to tabular data interfaces, such as ODBC. Such tools allow the developer to "bind" the visual controls to relational data, quickly build forms for data entry, and quickly generate reports for reporting information of interest. Quite simply, components that return arrays of structures cannot participate in this level of automation. Second, existing network transport mechanisms for returning these kinds of structures tend to have poor performance. Traditional transport mechanisms have generally been much better suited at transporting tabular data.

What is needed is a solution in which provides a simplified database connectivity interface for communicating with components, including Java and ActiveX components, as well as conventional C components, such that the interfaces of the components can be called for returning a tabular result set to the client. The present invention fulfills this and other needs.

SUMMARY OF THE INVENTION

A Component Transaction Server (CTS) is described, which provides a framework for deploying the middle-tier logic of distributed component-based applications. The CTS simplifies the creation and administration of Internet applications that service thousands of simultaneous clients. The CTS components, which execute on the middle-tier between end-user client applications and remote databases, provide efficient management of client sessions, security, threads, third-tier database connections, and transaction flow, without requiring specialized knowledge on the part of the component developer. The system's scalability and platform independence allows one to develop application on inexpensive uniprocessor machines, then deploy the application on an enterprise-grade multiprocessor server.

The CTS architecture supports a variety of thin-client front ends, including Java applets deployed on the Internet or Web, PowerBuilder™ clients deployed on a standard desktop, or any ActiveX client. Web-based clients communicate with server components executing in the CTS kernel using HTTP (HyperText Transport Protocol) and an HTTP server embedded in CTS. Windows-based clients communicate with server components using a streaming protocol, such as Sybase® Tabular Data Stream (TDS) protocol.

The CTS kernel includes a Session Management module, a Security module, a Result Set module, a Thread Polling module, a Transaction Management module, and a Connection Pooling module. Components execute within the CTS multithreaded kernel which provides automatic optimization of available system resources. By pooling and reusing resources such as threads, sessions, and database connections, the CTS eliminates significant system overhead. Here, CTS components execute on native threads within the CTS kernel. The CTS maintains a pool of threads and allocates them to components as needed. Components can be configured as single-threaded or multithreaded. If multithreaded, a thread can be allocated for the life of the component instance, or, for better scalability, a new thread can be allocated on each method invocation.

In the Result Set module, the CTS provides tabular result sets, thus making the environment very desirable for business applications. In most component-based systems, a component interface returns an object. CTS components can return either an object or a collection of objects called a "result set." The format of a result set is based on the standard ODBC result set, and it is roughly equivalent to a database cursor. Because they return a result set, CTS components are much simpler and more efficient to work with. For instance, result sets can be bound directly to data-aware controls such as a PowerBuilder® DataWindow, a Sybase® PowerJ Grid control, or any data-aware control that can be bound to an ODBC result set. In this fashion, GUI development with CTS is nearly identical to traditional two-tier systems. The CTS automatically manages partial refreshes and updates of the result set.

The CTS is middleware, an application server. Components installed on the CTS become usable across whatever network the CTS is connected to (which can include the Internet). In accordance with the present invention, a simplified database connectivity interface is provided for communicating with components, including JavaBeans, Java classes, ActiveX controls, and even DLLs (Dynamic Link Libraries). The interfaces of the components can be called for returning a tabular result set to the client. In a corresponding manner, a component (i.e., collection of methods) is provided at the client such that any one of its methods is marked for returning tabular results. When the system generates a stub for Java or a proxy for ActiveX, the system makes tabular results available through standard interfaces. In the instance of a Java component, for example, the system makes the results available through the JDBC (Java Database Connectivity) interface. Here, a client can invoke a method on a component and request the results as a tabular data set. For a Java component, the client can request a JDBC result handle (i.e., database cursor). In a visual development environment, such a handle could then be bound to a visual control or component, provide providing both component-based development and tabular data.

The CTS removes from the developer any concern for transaction management details. Any component installed in the server is a candidate for participation in a transaction. More important, no component in a transaction need concern itself with the behavior of other components in regards to their effect on the transaction—CTS handles all the details. For instance, suppose one has three components—A, B, and C—for use in a transaction. The CTS provides a versatile API that components call in order to keep the server informed of each component's transaction state. So, if components A and B succeed, while component C fails, the CTS aborts the overall transaction and deals with the dirty work of issuing rollbacks on whatever database resources A and B were communicating with. As mentioned, CTS is not limited to Java components. A CTS or Jaguar component can as easily be a C/C++ DLL or an ActiveX control. So, a client-side application written in Java cannot only remotely invoke a JavaBean or Java class, it can as easily invoke a C/C++ routine in a DLL or an ActiveX control. Similarly, a CTS client could be an ActiveX control, calling a JavaBean or a C/C++ DLL.

The CTS provides the necessary tools for generating the stub files needed for a Java client to communicate with a CTS component (regardless of the component's species). The stub files contain the minimum methods that appear to the Java client application as the methods of the remote component; within the stub is the code that establishes a session with the CTS server and commands the server to instantiate the actual component. The stub also handles the client end of marshaling the data between the client and the CTS server.

DETAILED DESCRIPTION OF A PREFERRED EMBODIMENT

The following description will focus on the presently-preferred embodiment of the present invention, which is operative in a network environment executing component-based multi-tier application programs which interact with remote data, such as stored on an SQL database server. The present invention, however, is not limited to any particular application or environment. Instead, those skilled in the art will find that the present invention may be advantageously applied to any application or environment where optimization of query performance is desirable, including non-SQL database management systems and the like. The following description is, therefore, for the purpose of illustration and not limitation.

Standalone System Hardware

Figure 1A:
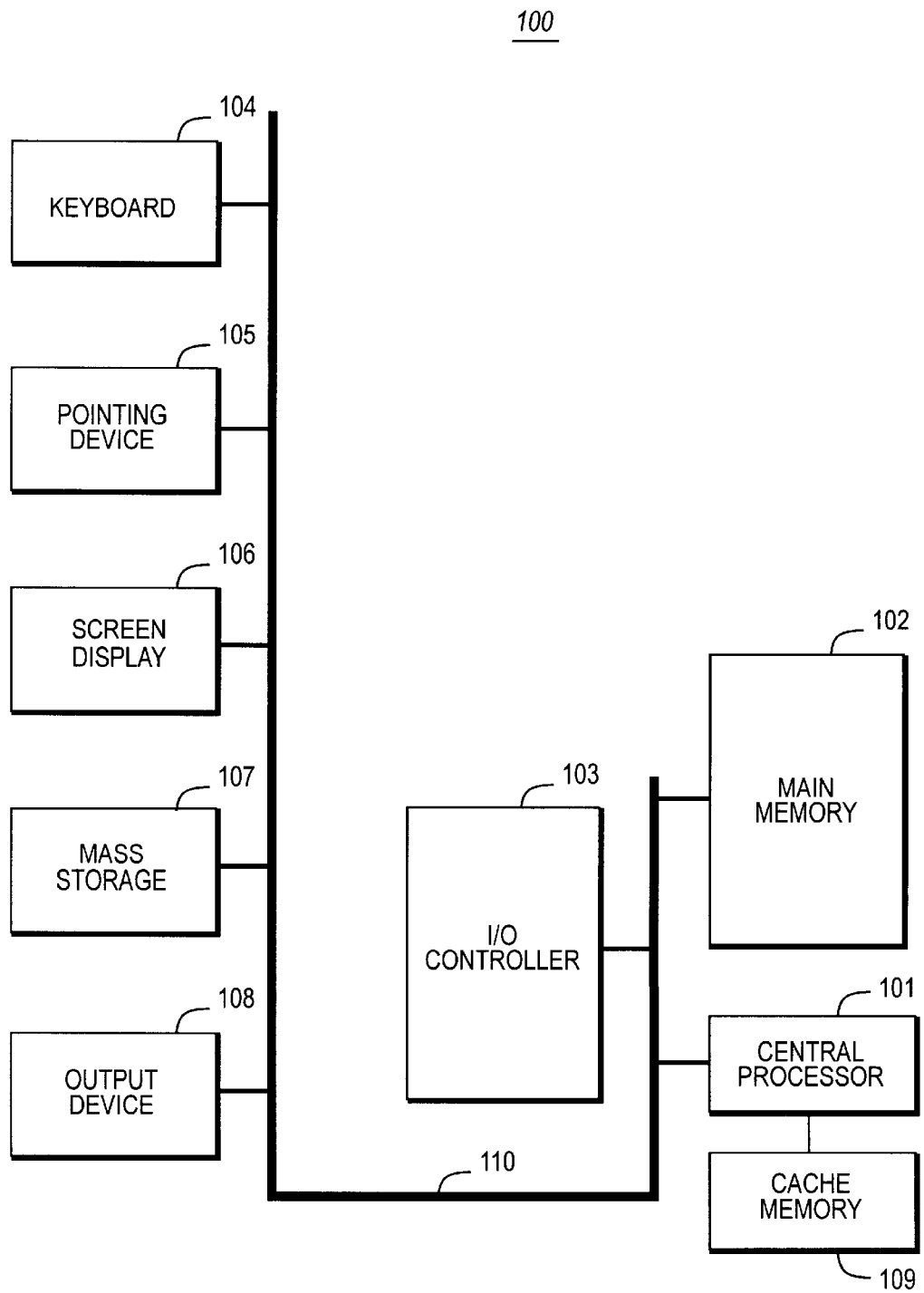
FIG. 1A is a block diagram of a computer system in which the invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
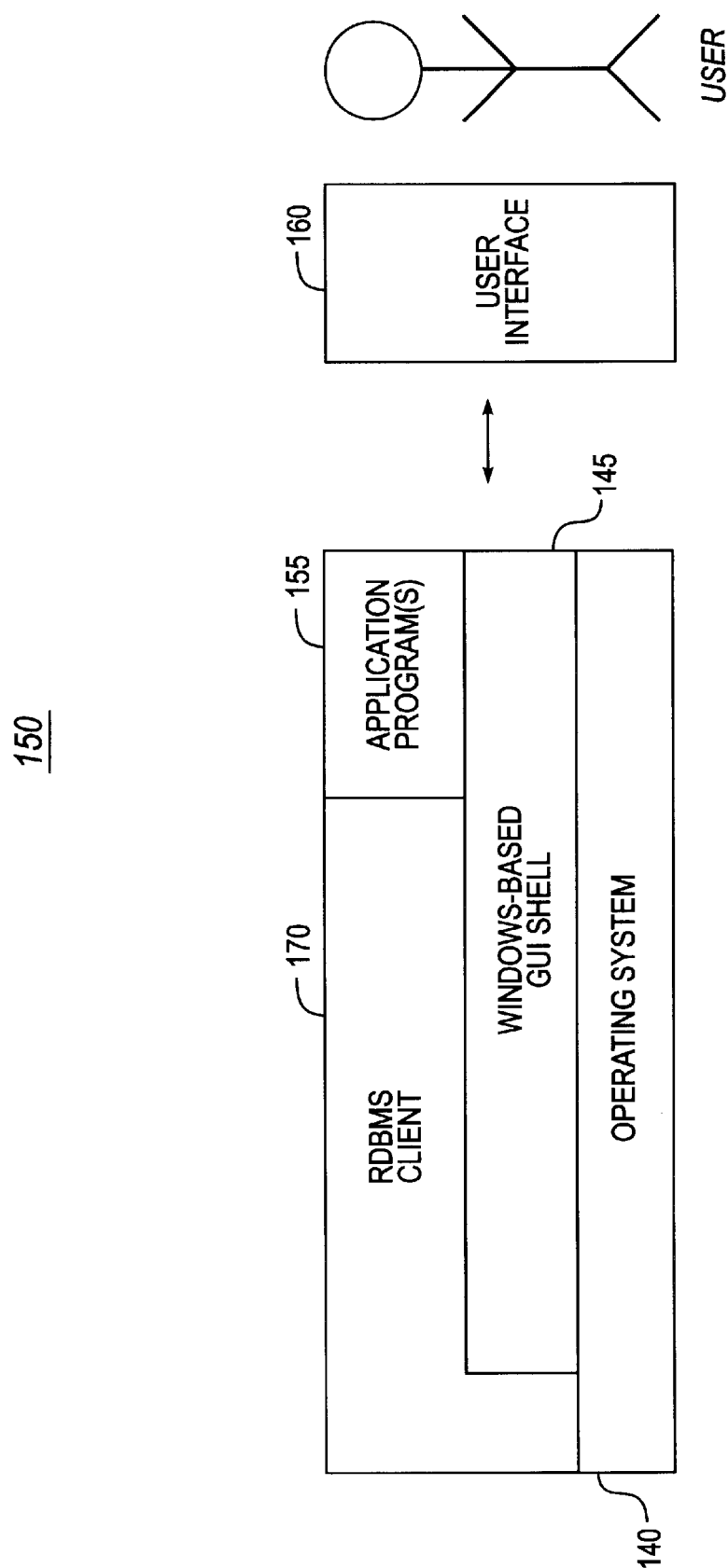
FIG. 1B is a block diagram of a computer software system provided for directing the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows-based GUI (graphical user interface) shell 145. One or more application programs, such as application software programs 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilder™, dBASE®, Paradox®, Microsoft® Access, or the like, and the front-end will include SQL access drivers (e.g., Borland SQL Links, Microsoft® ODBC drivers, Intersolv® ODBC drivers, and the like) for accessing database tables from an SQL database server operating in a Client/Server environment. In a most-preferred embodiment, the RDBMS client comprises PowerBuilder Enterprise 6.0 for Windows, available from Powersoft of Concord, Mass., a wholly-owned subsidiary of Sybase, Inc. Description of PowerBuilder can be found in the manuals accompanying PowerBuilder Enterprise; additional description can be found in U.S. Pat. No. 5,566,330, issued Oct. 15, 1996, the disclosure of which is hereby incorporated by reference.

Client/Server Database Management System

A. General

Figure 2:
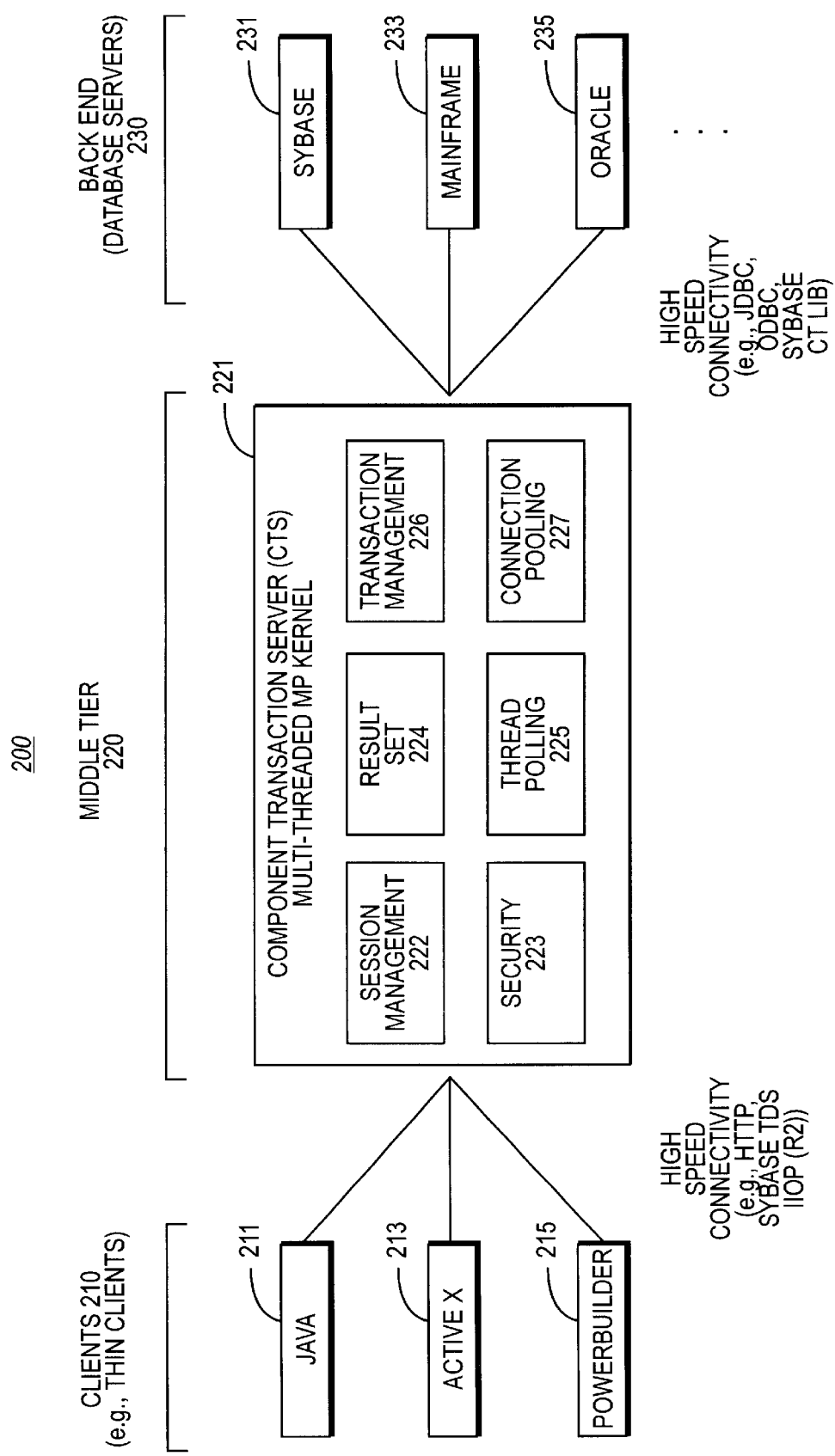
FIG. 2 is a block diagram illustrating the general structure of a Three-tier Database System suitable for implementing the present invention.

While methods of the present invention may operate within a single (standalone) computer (e.g., system 100 of FIG. 1A), the present invention is preferably embodied in a multi-tier computer system, such as a Three-tier Client/Server system. FIG. 2 illustrates the general structure of a Three-tier Database System 200 suitable for implementing the present invention. As shown, the system 200 comprises one or more Thin Client(s) 210 (e.g., Java client 211, ActiveX client 213, and PowerBuilder client 215) connected to Back End Servers (e.g., Sybase database server 231, mainframe (e.g., IBM DB2) 233, and Oracle database server 235) via a middle tier 220 comprising a Component Transaction Server (CTS) 221. In an exemplary embodiment, the Clients may themselves include standalone workstations, dumb terminals, or the like, or comprise personal computers (PCs) such as the above-described system 100. Typically, such units would operate under a client operating system, such as Microsoft Windows 9x for PC clients. Each Back End Server, such as Sybase® SQL Server™, now Sybase® Adaptive Server™ (available from Sybase, Inc. of Emeryville, Calif.) in an exemplary embodiment, generally operates as an independent process (i.e., independently of the Clients), running under a server operating system such as Microsoft Windows NT (Microsoft Corp. of Redmond, Wash.), NetWare (Novell of Provo, Utah), UNIX (Novell), or OS/2 (IBM).

The components of the system 200 communicate over a network which may be any one of a number of conventional network systems, including a Local Area Network (LAN) or Wide Area Network (WAN), as is known in the art (e.g., using Ethernet, IBM Token Ring, or the like). The network includes functionality for packaging client calls in the well-known SQL (Structured Query Language) together with any parameter information into a format (of one or more packets) suitable for transmission across a cable or wire, for delivery to the database servers.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see Method and System for Opportunistic Locking in a Networked Computer System, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

System Architecture

A. Component Transaction Server (CTS) Basic Architecture

The Component Transaction Server (CTS) 221, which in an exemplary embodiment comprises Sybase® Jaguar CTS™, provides a framework for deploying the middle-tier logic of distributed component-based applications. CTS 221 simplifies the creation and administration of Internet applications that service thousands of simultaneous clients. The CTS components, which execute on the middle-tier between end-user client applications and remote databases, provide efficient management of client sessions, security, threads, third-tier database connections, and transaction flow, without requiring specialized knowledge on the part of the component developer. The system's scalability and platform independence allows one to develop application on inexpensive uniprocessor machines, then deploy the application on an enterprise-grade multiprocessor server.

The CTS architecture supports a variety of thin-client front ends, including Java applets deployed on the Internet or Web, PowerBuilder™ clients deployed on a standard desktop, or any ActiveX client. Web-based clients communicate with server components executing in the CTS kernel using HTTP (HyperText Transport Protocol) and an HTTP server embedded in CTS. Windows-based clients communicate with server components using a streaming protocol, such as Sybase® Tabular Data Stream (TDS) protocol.

As shown in FIG. 2, the CTS kernel includes a Session Management module 222, a Security module 223, a Result Set module 224, a Thread Polling module 225, a Transaction Management module 226, and a Connection Pooling module 227. Components execute within the CTS multithreaded kernel which provides automatic optimization of available system resources. By pooling and reusing resources such as threads, sessions, and database connections, the CTS eliminates significant system overhead. Here, CTS components execute on native threads within the CTS kernel. The CTS maintains a pool of threads and allocates them to components as needed. Components can be configured as single-threaded or multithreaded. If multithreaded, a thread can be allocated for the life of the component instance, or, for better scalability, a new thread can be allocated on each method invocation.

In the Session Management module 222, the CTS 221 maintains a pool of communications sessions and allocates them to clients as needed. Each session maintains the context and state of the connection. As sessions are released, they are returned to the pool for subsequent clients. In the Connection Pooling module 227, the CTS 221 also maintains a pool of database connections that are allocated to server components as needed. Database connections can be implemented using the Sybase-native CT-Lib interface or using ODBC or JDBC interfaces.

Transaction management is provided by the Transaction Management module 226. CTS 221 supports implicit transactions whose properties are defined declaratively at the time that the components are assembled into applications. Components are automatically enrolled in a transaction, and no special coding is required. Jaguar CTS supports full two-phase commit (2PC) transactional integrity for multi-database updates. To coordinate transactions, the CTS 221 can use either Microsoft Distributed Transaction Coordinator (DTC) or any transaction coordinator that conforms with the Java Transaction Service (JTS), a Java enterprise service based on the Open Group Distributed Transaction Processing (D-TP) standard. The CTS 221 supports asynchronous transactions using the Sybase database queuing service, dbQ.

The transactional semantics of an application component are defined through its transaction properties. These properties are functionally equivalent to the transaction properties supported within the Microsoft Transaction Server (MTS). Transaction semantics include:

| | |
|---|---|
| Not Supported: | The component is not able to participate in a transaction and will fail if a transaction exists. |
| Allows: | The component does not require a transaction but is able to participate in a transaction if one exists. |
| Requires: | The component requires a transaction. If a transaction exists, the component will enlist in that transaction. If a transaction does not exist, it will initiate a new transaction. |
| Requires New: | The component requires its own transaction and always initiates a new transaction even if one exists. |

In the Security module 223, access control lists (ACLs) can be defined at the application level. Unauthorized users are prevented from executing components within the application. User identity is based on operating system login.

In the Result Set module 224, the CTS 221 provides tabular result sets, thus making the environment very desirable for business applications. In most component-based systems, a component interface returns an object. CTS components can return either an object or a collection of objects called a "result set." The format of a result set is based on the standard ODBC result set, and it is roughly equivalent to a database cursor. Because they return a result set, CTS components are much simpler and more efficient to work with. For instance, result sets can be bound directly to data-aware controls such as a PowerBuilder™ DataWindow, a Sybase® PowerJ Grid control, or any data-aware control that can be bound to an ODBC result set. In this fashion, GUI development with CTS is nearly identical to traditional two-tier systems. The CTS 221 automatically manages partial refreshes and updates of the result set.

In the currently-preferred embodiment, the CTS 221 employs Sybase® Tabular Data Stream, the native Sybase communications protocol to deliver streams of tabular data. In general, developers and users are not aware of TDS. When ActiveX components are imported into the system, an ActiveX Automation proxy client interface is automatically generated that transparently converts the ActiveX requests into TDS protocol. The Automation client proxy and the TDS protocol stack is deployed on each client system. The CTS architecture actually supports a variety of communication protocols, however. The session management service provides a layer of abstraction between the communications protocol and the components. Therefore, the system can be adapted to support other protocols, such as IIOP, TDS tunneled through HTTP or SSL, or the like.

Component-based Development with Tabular Data

A. Overview

The CTS is middleware, an application server. Components installed on the CTS become usable across whatever network the CTS is connected to (which can include the Internet). In accordance with the present invention, a simplified database connectivity interface is provided for communicating with components, including JavaBeans, Java classes, ActiveX controls, and even DLLs (Dynamic Link Libraries). The interfaces of the components can be called for returning a tabular result set to the client. In a corresponding manner, a component (i.e., collection of methods) is provided at the client such that any one of its methods is marked for returning tabular results. When the system generates a stub for Java or a proxy for ActiveX, the system makes tabular results available through standard interfaces. In the instance of a Java component, for example, the system makes the results available through the JDBC (Java Database Connectivity) interface. Here, a client can invoke a method on a component and request the results as a tabular data set. For a Java component, the client can request a JDBC result handle (i.e., database cursor). In a visual development environment, such a handle could then be bound to a visual control or component, provide providing both component-based development and tabular data.

The CTS removes from the developer any concern for transaction management details. Any component installed in the server is a candidate for participation in a transaction. More important, no component in a transaction need concern itself with the behavior of other components in regards to their effect on the transaction—CTS handles all the details. For instance, suppose one has three components—A, B, and C—for use in a transaction. The CTS provides a versatile API that components call in order to keep the server informed of each component's transaction state. So, if components A and B succeed, while component C fails, the CTS aborts the overall transaction and deals with the dirty work of issuing rollbacks on whatever database resources A and B were communicating with. As mentioned, CTS is not limited to Java components. A Jaguar component can as easily be a C/C++ DLL or an ActiveX control. So, a client-side application written in Java cannot only remotely invoke a JavaBean or Java class, it can as easily invoke a C/C++ routine in a DLL or an ActiveX control. Similarly, a CTS client could be an ActiveX control, calling a JavaBean or a C/C++ DLL.

The CTS provides the necessary tools for generating the stub files needed for a Java client to communicate with a CTS component (regardless of the component's species). The stub files contain the minimum methods that appear to the Java client application as the methods of the remote component; within the stub is the code that establishes a session with the CTS server and commands the server to instantiate the actual component. The stub also handles the client end of marshaling the data between the client and the CTS server.

B. Exemplary session: PowerBuilder example

Figure 3:
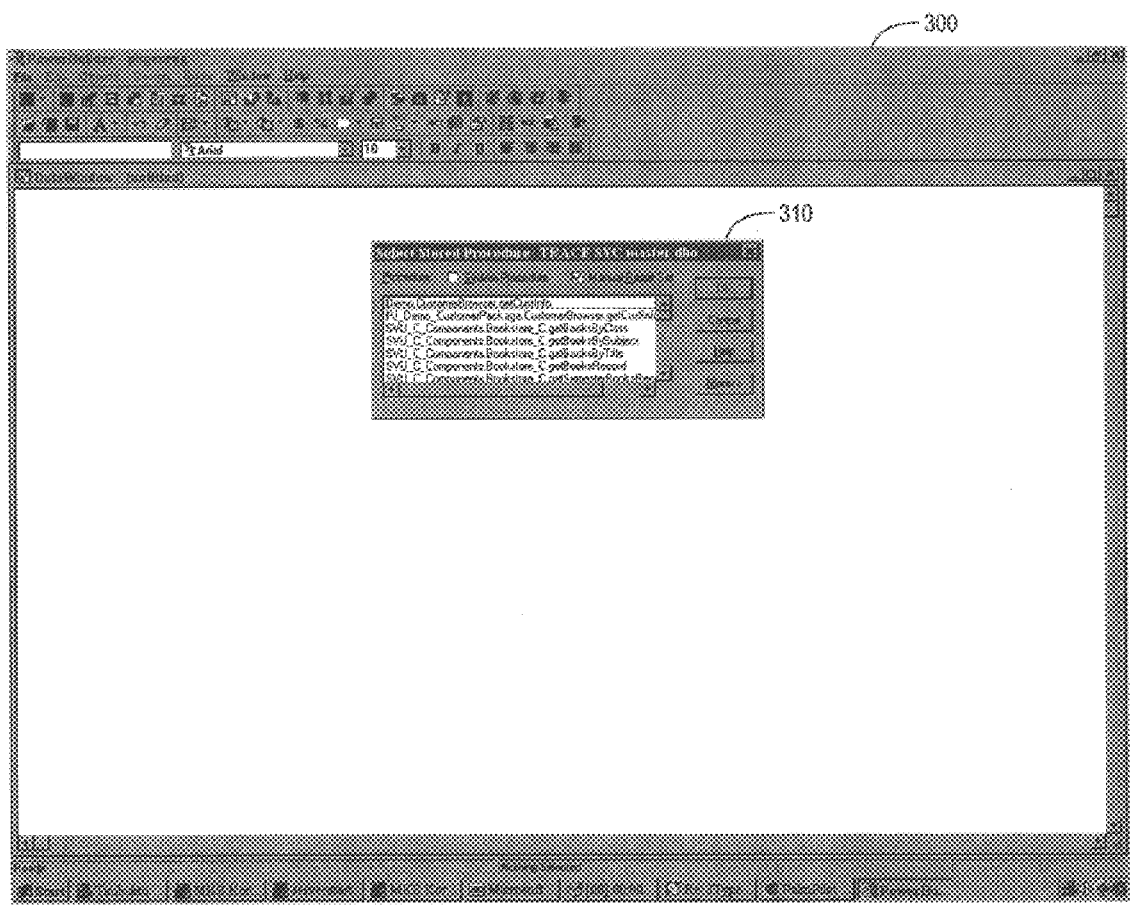
FIGS. 3–6 are bit map screen shots illustrating a visual development environment (e.g., PowerBuilder®) where a client can invoke a method on a component and request the results as a tabular data set, using the system of the present invention.

Operation of the system is perhaps best illustrated by way of example. FIG. 3 illustrates a PowerBuilder design window or "painter" having a "data window" control for connecting to remote data sources. In this example, the control is connected to the Component Transaction Server (Sybase® Jaguar CTS™) of the present invention, residing in the middle tier and acting as the data source. From the perspective of the PowerBuilder environment, the data window control in effect "thinks" that it is connected to an SQL data source.

Proceeding with the example, the user will create a new data window, such as a stored procedure data window, for illustrating that a method on a component can be made to look like a stored procedure (i.e., returning a tabular result set). At this point, the PowerBuilder environment sends a query requesting a list of stored procedures. The component transaction server, in response, enumerates what components are on the transaction server and what methods are on those components. Thereafter, the component transaction server returns a list of the enumerated items, in effect making them appear as storage procedures to PowerBuilder, as shown by dialog 310.

Figure 4:
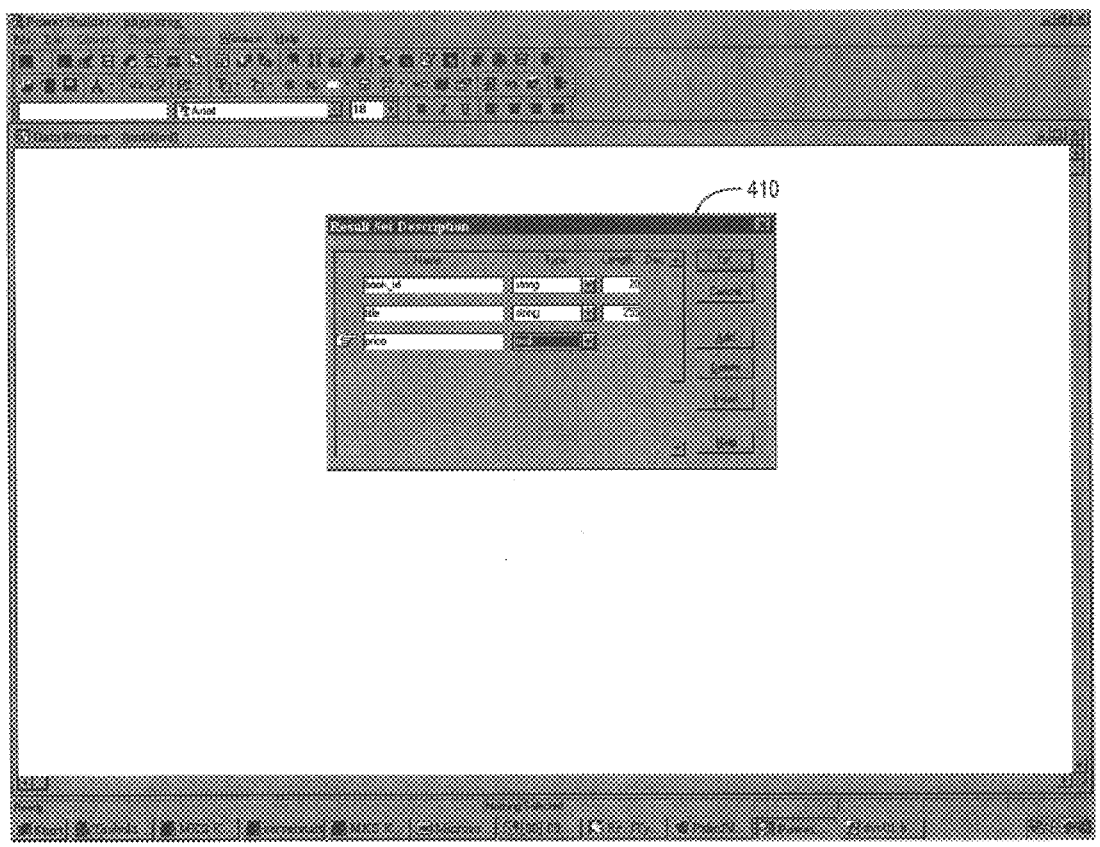
Figure 5:
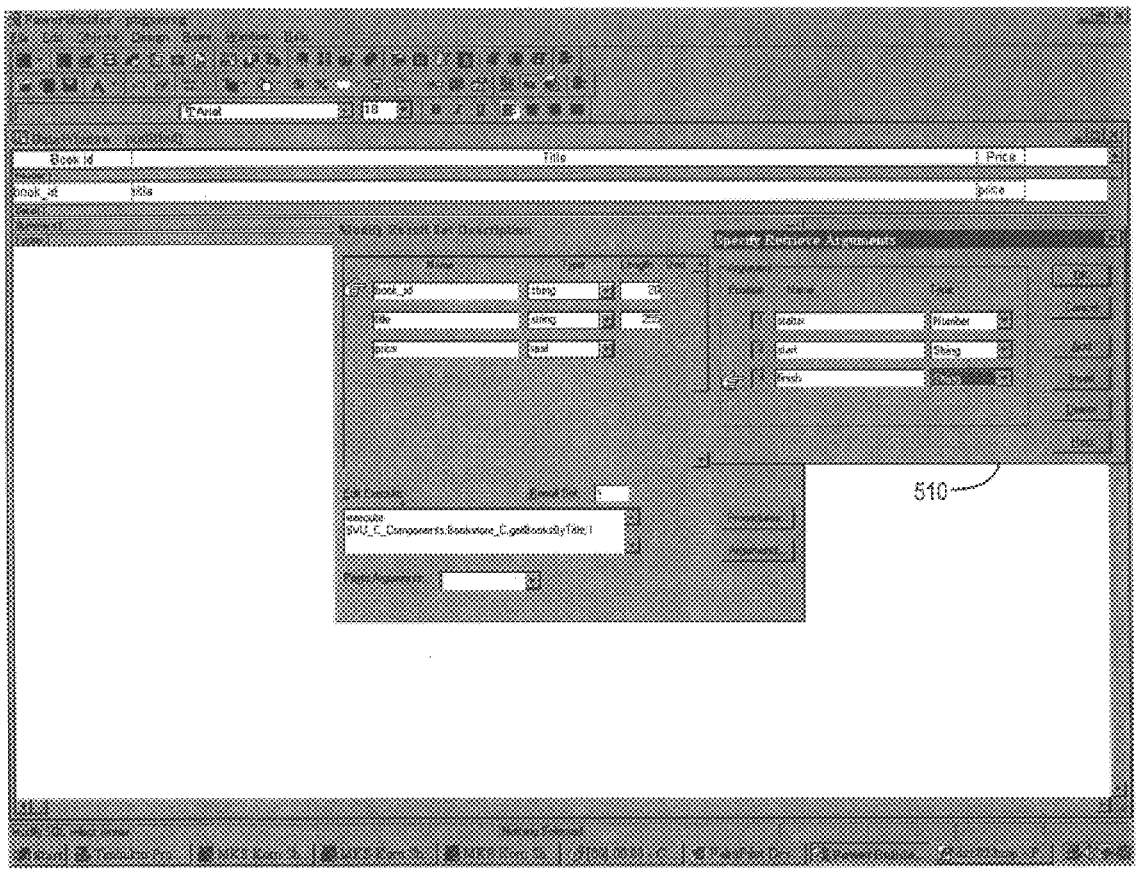
Figure 6:

Consider as an example, for instance, a component named "book store" with a method entitled "get books by title." Using a conventional approach, there is no way of knowing what results the method will return if one were to simply use querying technique. Therefore, conventionally, one is required to know beforehand what results are returned by the method. Using the approach of the present invention, however, this is not required. As shown in FIG. 4, the user simply proceeds as follows. First, the user enters expected data types, such as a text type for title and a real (floating point) type for price, as shown in dialog 410, and then specifies retrieve arguments, as shown in dialog 510 in FIG. 5. Then, after specifying argument information and indicating a start and a finish, the information can be executed against the component residing on the middle tier, not against the database. The data is returned to the client as a tabular data set, despite the fact that the method itself is simply one which returns books by title. This is shown at 610 in FIG. 6.

C. Internal operation/design

1. General

An important aspect of the design is the ability of a component to return a result back to the client. From the perspective of a component writer, the present invention provides an application programming interface (API) for "pushing" a data set to clients. Interface calls are provided for describing every column, binding variables to those columns, initializing those variables, and then sending the data. In the currently-preferred embodiment, the interface is defined for Java, ActiveX, and C, thus allowing all component models supported by the system a means to send tabular result sets.

The currently-preferred embodiment employs the interface provided by Sybase® Open Serve™ as follows. One module of the component transaction server functions to convert native data types of the components to corresponding ones for Open Server. Once the data types have been converted, the component transaction server may then proceed to retrieve the component data into a memory buffer or cache. Thereafter, the component transaction server proceeds to invoke to write data out using a streaming tabular protocol, such as Sybase® tabular data stream (TDS), or CORBA's IIOP (Internet InterORB Protocol) streaming protocol.

On the client side, the user is able to generate a component graphically (e.g., using PowerBuilder or other visual development environment). For a Java component, the system of the present invention generates a stub. The stub, which resembles a Java class, include employs JDBC for sending requests to the component transaction server for receiving tabular result sets back.

2. Objects and methodologies for "Methods as Stored Procedures"

Three major classes are employed for implementing the "Methods as Stored Procedures" (MASP) feature of the CTS system: Metadata, Command, and Marshaller. Each will be explained in turn.

a. Metadata

The Metadata class is used to cache metadata information about all the components installed in the server. In particular, it caches all the method definitions. This, as highlighted below, is needed for the "Marshaller" to properly parse incoming requests from clients.

Component metadata is also used to support PowerBuilder™ stored procedure DataWindow™. Powerbuilder queries the CTS as though it were a database, asking it what stored procedures are available. The CTS responds by delivering a tabular result set containing the names of all the available component methods. This information is acquired by iterating through the metadata hash table that was created at startup by one of Metadata's methods, Metadata::loadMetadata( ).

The Metadata class, and its supporting classes, ParamDef and MethodDef, may be defined as follows.

```
class ParamDef
{
public:
    ParamDef();
    ~ParamDef();
    CS_RETCODE    init(CS_CHAR *);
    void          destroy();
    void          setNumber(CS_INT);
    void          setType(CS_INT);
    void          setMode(JagParamMode);
    CS_CHAR *     getFullName(void);
    CS_CHAR *     getShortName(void);
    CS_INT        getNumber(void);
    CS_INT        getType(void);
    JagParamMode  getMode(void);
protected:
    CS_CHAR *     m_fullName;
    CS_CHAR *     m_shortName;
    CS_INT        m_type;
    CS_INT        m_number;
    JagParamMode  m_mode;
};
class MethodDef
{
public:
    MethodDef();
    ~MethodDef();
    CS_RETCODE  init(CS_CHAR *pkgname, CS_CHAR *fullName,
    CS_INT
numparams)
    void destroy();
    void          addParamDef(ParamDef *);
    CS_CHAR *     getPackageName();
    CS_CHAR *     getFullName();
    CS_CHAR *     getShortName();
    CS_INT        getNumParams ();
    ParamDef ** getParams();
    // param numbers start at 1
    ParamDef *    getParamDef(CS_INT paramnum);
    CS_INT *      getParamTypes();
    CS_VOID       logSelf();          // Write
                                      member data to the log
protected:
    CS_CHAR *    m_pkgname;
    CS_CHAR *    m_fullName;
    CS_CHAR *    m_shortName;
    CS_INT       m_numparams;
    ParamDef ** m_pparams,      // Array of parameter definitions
    CS_INT *     m_pparamTypes; // Array of parameter types
};
class Metadata
{
public:
    static CS_RETCODE loadMetaData(void);
    static CS_RETCODE getMethodDef(CS_CHAR *, MethodDef **);
protected:
    static JagParamMode getModeFromString(CS_CHAR *);
    static CS_RETCODE loadMethodsInPackages(AF_VALUE
        *packages,
                  HashTable *htMethods);
    static CS_RETCODE loadMethodsInComponents(CS_CHAR
        *pkgname,
                  AF_VALUE *comps, HashTable *htMethods);
    static CS_RETCODE loadMethodsInInterfaces(CS_CHAR
        *pkgname,
                  CS_CHAR *compname, AF_VALUE *intfs,
                  HashTable *htMethods);
    static CS_RETCODE loadMethods(CS_CHAR *pkgname,
                  CS_CHAR *fullIntfName,
                  AF_VALUE *methods, HashTable *htMethods);
    static CS_RETCODE addMethod(CS_CHAR *, AF_SECTION *,
                  HashTable *);
    static CS_RETCODE loadParamInfo(CS_CHAR *, CS_CHAR *,
                  ParamDef *);
    static CS_RETCODE getTypeFromJagString(CS_CHAR *,
    CS_INT *);
```

```
    static CS_RETCODE loadTypeStrings(void);
    static CS_VOID    logMethodDefs(HashTable *ht);
};
```

Here, the first two classes, ParamDef and MethodDef, basically encapsulate the metadata for parameters and methods. The public methods are a series of set and get methods for the various elements of this metadata.

The class Metadata is a series of static methods that are used to load the component metadata into a hash table at startup, and then to be able to look up the metadata for a particular method at runtime. The public routine loadMetaData is called when the server starts up. This routine scans the CTS repository, and stores the information about the components and their methods in a hash table. The key for the hash table is a fully scoped method name (e.g. <package>.<component>.<method>). This uniquely identifies a particular method in the server. The public routine getMethodDef takes a fully scoped method name and returns an instance of MethodDef for that method. This is called by Command::runJaguarStoredProc (described further below). This method definition is then passed to the Marshaller for the current request. This allows the Marshaller to properly parse and convert the parameters for the method.

b. Command

The Command class, when instantiated as an object, represents a particular request from a client. It is defined as follows.

```
class Command
{
public:
    static CS_RETCODE runCommands (void);
private:
    static CS_RETCODE runCreate (void);
    static CS_RETCODE runInvoke (void);
    static CS_RETCODE runDestroy(void);
    static CS_RETCODE runSpServerInfo(void);
    static CS_RETCODE runSpPb50db(void);
    static CS_RETCODE runSpPbProclist (JagPbVersion pbVersion);
    static CS_RETCODE runSelect (void);
    static CS_RETCODE runIgnoreCommand(void);
    static CS_RETCODE runIgnoreStoredProc (void);
    static CS_RETCODE runJagStoredProc(CS_CHAR *);
    static CS_RETCODE runShutdown(void);
    static JagCmdType getCmdType(CS_CHAR *cmdstring);
    static CS_INT     getVersion(CS_CHAR *versstr);
    static CS_CHAR * getVersionString(CS_INT version);
    static CS_BOOL    isValidJaguarCommand(CS_CHAR
                          *cmdstring);
};
```

As shown, this class is simply a collection of static methods; no member data is used. The only public method available on this class is runCommands. This method is called by the server's request handler when it receives a request from the client. The runCommands( ) calls getCmdType to determine the type of command. This routine looks up the command name sent by the client in a static table, which may be constructed as follows.

```
static_cmdmap CmdMap[] =
{
    {"sp_server_info",    CMDTYPE_SP_SERVER_INFO},
```

-continued

```
{"Sp_SeRvEr_Info",    CMDTYPE_SP_SERVER_INFO},
{"shutdown",          CMDTYPE_SHUTDOWN},
{"SHUTDOWN",          CMDTYPE_SHUTDOWN},
{"create",            CMDTYPE_CREATE},
{"invoke",            CMDTYPE_INVOKE},
{"destroy",           CMDTYPE_DESTROY},
{"sp_pb50db",         CMDTYPE_SP_PB50DB},
{"sp_pb60db",         CMDTYPE_SP_PB50DB},
{"sp_pb50proclist",   CMDTYPE_SP_PB50PROCLIST},
{"sp_pb60proclist",   CMDTYPE_SP_PB60PROCLIST},
{"sp_mda",            CMDTYPE_IGNORE_SP},
{"CREATE",            CMDTYPE_IGNORE},
{"use",               CMDTYPE_IGNORE},
{"USE",               CMDTYPE_IGNORE},
{"insert",            CMDTYPE_IGNORE},
{"INSERT",            CMDTYPE_IGNORE},
{"begin",             CMDTYPE_IGNORE},
{"BEGIN",             CMDTYPE_IGNORE},
{"commit",            CMDTYPE_IGNORE},
{"COMMIT",            CMDTYPE_IGNORE},
{"rollback",          CMDTYPE_IGNORE},
{"ROLLBACK",          CMDTYPE_IGNORE},
{"select",            CMDTYPE_SELECT},
{"SELECT",            CMDTYPE_SELECT},
{"grant",             CMDTYPE_IGNORE},
{"GRANT",             CMDTYPE_IGNORE},
{"set",               CMDTYPE_IGNORE},
{"SET",               CMDTYPE_IGNORE},
{"sp_pb50text",       CMDTYPE_IGNORE_SP},
{"sp_pb60text",       CMDTYPE_IGNORE_SP},
{"sp_datatype_info",  CMDTYPE_IGNORE_sp},
{"sp_pb50procdesc",   CMDTYPE_IGNORE_SP},
{"sp_pb60procdesc",   CMDTYPE_IGNORE_SP},
{NULL,                CMDTYPE_IGNORE}
};
```

As shown, many commands are ignored by the CTS. This is done in an effort to "mimic" an actual database server. Here, the client thinks it is talking to a database server, but it is actually talking to the CTS. Certain applications running on a client, such as Powerbuilder™, will attempt to create tables and insert data that contain database metadata. These operations are not supported in a middle-tier transaction server, so the CTS "pretends" to do it and simply return a success. Although this approach is not always successful, in a large percentage of situations it allows the system to work with these types of clients.

Once runCommand( ) gets the command type, it uses this in a switch statement to determine which static method on the Command class to run. If there is no match in the static table, runCommand( ) assumes this is a client attempting to invoke a method on a component as though it were a stored procedure in a database. It first calls is ValidJaguarCommand( ), to make sure the syntax is OK, and then calls runJagStoredProc( ).

In pseudo-code, the basic approach is as follows.

```
runcommand()
{
    Get command name from Marshaller
    Get command type
    switch (command type)
    {
        case CMDTYPE_IGNORE:
            runIgnoreCommand();
            break;
        default:
            if (isValidJaguarCommand())
            {
                runJaguarStoredProc(cmdName)
            }
    }
}
```

The format of the command name is <package>.<component>.<method>. Then, runJaguarStoredProc( ) looks up the method in the Metadata cache and, if it is found, creates the component, calls the method on the component, returns the results to the client, and then destroys the component. The basic approach can be summarized as follows, again in pseudo-code.

```
runJaguarStoredProc(string cmdName)
{
    marshaller = Marshaller for this request
    mdef = Metadata::getMethodDef(cmdName)
    marshaller->setMethodDef(mdef)
    parse cmdName into package, component, and method
    comp = create component(pkg, comp)
    comp->invoke(method)
    delete component
}
```

Note that the method definition is passed into the Marshaller, so that the Marshaller knows the expected types of the parameters, and how many to expect, as it parses the command buffer.

c. Marshaller

The Marshaller is basically responsible for parsing incoming requests from clients and for delivering responses back to clients. There are two ways a client can send a request to the server. One is through a simple ASCII text buffer, such as "exec MyPackage.BigComponent.FunMethod 2, 'string param', 47"
This is called a language request.

The other mechanism is as a remote procedure call, called an RPC request. In this case, the procedure name and its parameters are "pre-parsed" by the client. Rather than a long string buffer, the data for an RPC is accessed by calling a series of Open Server (i.e., Sybase®Open Server™) methods. To get the procedure name, srv_rpcname( ) is called. To get parameters, a series of methods (srv_descfmt( ), srv_bind, srv_xferdata) are called for each parameter. Each parameter can be of any type, whereas parameters in a language request are character strings.

Although the mechanisms for accessing the procedure name and parameters are quite different, the end result is identical: a client is requesting an invocation of a component method. This similar behavior is encapsulated in the abstract Marshaller class. There are two concrete implementations of this class, TDSMarshaller and LangMarshaller. TDSMarshaller is a Marshaller that handles RPC requests, including Sybase(K TDS protocol.

The Marshaller, TDSMarshaller and LangMarshaller may be defined as follows.

```
class Marshaller
{
public:
```

-continued

```
    Marshaller(AnyPtr);
    virtual ~Marshaller();
    enum State {CREATE, DESTROY};
    const State GetState() const;
    virtual CS_BOOL    getHasMoreCommands (void);
    virtual void       setHasMoreCommands(CS_BOOL);
    virtual Integer    getRowsAffected (void);
    virtual void       setRowsAffected(Integer);
    virtual void       setMethodDef(MethodDef *);
    virtual MethodDef* getMethodDef(void);
    virtual AnyPtr     getStreamPtr(void);
    virtual Status newCommand(void) = 0;
    virtual Status getCommandName(char *, Integer) = 0;
    virtual Status getDBName(char *, Integer) = 0;
    virtual Status getOwner(char *, Integer) = 0;
    virtual Status getCommandVersion(char *, Integer) = 0;
    virtual CS_CHAR * getFullCommandString(void) = 0;
    virtual Integer getNumParams(void) = 0;
    virtual Status getAParam(ParamData&) = 0;
    virtual Status getAllParams(ParamList&) = 0;
    virtual Status sendAParam(ParamData&) = 0;
    virtual Status sendAllParams(ParamList&) = 0;
    virtual Status sendStatus(Status) = 0;
    virtual Status sendDone (Status) = 0;
protected:
    Integer     m_readIndex;
    Integer     m_numparams;
    AnyPtr      streamPtr;
    CS_BOOL     m_hasMoreCommands;
    Integer     m_rowsAffected;
    MethodDef * m_pmdef;
private:
    State_State;
    void ChangeState(const State);
};
class TDSMarshaller : public Marshaller
{
public:
    TDSMarshaller (AnyPtr);
    virtual ~TDSMarshaller();
    virtual Status newCommand(void);
    virtual Status getCommandName(char *, Integer);
    virtual Status getDBName(char *, Integer);
    virtual Status getOwner(char *, Integer);
    virtual Status getCommandVersion(char *, Integer);
    virtual CS_CHAR * getFullCommandString(void);
    virtual Integer getNumParams(void);
    virtual Status getAParam(ParamData&);
    virtual Status getAllParams (ParamList&);
    virtual Status sendAParam(ParamData&);
    virtual Status sendAllParams(ParamList&);
    virtual Status sendStatus(Status);
    virtual Status sendDone(Status);
protected:
    char m_cmdname [CS_MAX_CHAR];
    Integer m_cmdnamelen;
    char m_version[100];
    Integer m_versionlen;
    char m_dbname[CS_MAX_CHAR];
    Integer m_dbnamelen;
    char m_owner[CS_MAX_CHAR];
    Integer m_ownerlen;
    char *m_fullCommandString;
    Integer m_fullCommandLen;
};
/*
** This provides an implementation of TDS Marshaller
** where the request came in as a LANGUAGE request.
**
** One thing the Lang Marshaller needs is a list of types
** for the expected params, so it can correctly implement
** getAparam and getAllParams.
**
** Also, a Language request can contain multiple commands,
** whereas an RPC request can have only one.
**
*/
class TDSLangMarshaller : public TDSMarshaller
{
```

-continued

```
public:
    TDsLangMarshaller (AnyPtr);
    virtual ~TDsLangMarshaller ();
    virtual Status init(CS_CHAR *langbuf);
    virtual Status newCommand(void)
    virtual Status getAParam(ParamData&);
    virtual Status getAllParams(ParamList&);
    virtual Status sendAParam(ParamData&);
    virtual Status sendAllParams(ParamList&);
    virtual Status sendDone(Status);
protected:
    CS_INT *       m_paramTypes;
    CS_CHAR *      m_langcmd;
    CS_CHAR *      m_langptr;
    CS_CHAR *      m_curword;
    Integer        m_wordlen;
    CS_CONTEXT *   m_contextp;
    Integer        m_writeIndex;    // for output params
private:
    Status         getDestLength(CS_INT, CS_INT,
                                 CS_INT *);
    Status         nextWord(void);
    Status         getWord(char **);
    int            getWordLength(void);
    static int     IsDoubleQuote(char);
    static int     IsSingleQuote(char);
};
```

Of interest herein, the first set of methods, such as getMethodDef( ) and setMethodDef( ), are used to get and set properties on the Marshaller. The next set of methods are employed for getting or setting information about the current request. For example, a language buffer can contain multiple requests. The method newCommand( ) tells the Marshaller that the system has fully processed the previous request and that it is ready for a new one. The Marshaller assumes that the next token in the language buffer is the command name.

Also of interest are routines to read in parameters and to send output parameters back to the client. LangMarshaller inherits from TDSMarshaller, and is therefore able to delegate many of its methods up to TDSMarshaller. LangMarshaller reimplements methods only where necessary. This is particularly true when it comes to parsing parameters off of the language buffer. Many of the private methods on Lang-Marshaller are helper functions for parsing the language buffer.

A Marshaller instance is created when a new request comes in from a client. If the request is a RPC request, a TDSMarshaller is created. If the request is a language request, an instance of LangMarshaller is created. The pointer to this instance is then saved into thread-local storage. Any method that needs access to the Marshaller for this request can simply pull it out of this storage.

An aspect of the Marshaller that is of particular interest is how the Language Marshaller uses the method metadata to convert the string representations of the parameters into the types the component expects when the method is invoked. The first step of this process is done by Command::runJaguarStoredProc. As shown above, it looks up the MethodDef instance for the current method request by calling Metadata::getMethodDef. This instance is then passed to the Marshaller using Marshaller::setMethodDef. This method definition is ignored by the TDSMarshaller, but is important for the LangMarshaller.

Once the "method def" is set up, Command::runJaguarStoredProc then invokes the method. This results in a component skeleton or dynamic dispatcher being called. This skeleton calls the Marshaller method getAParam( ) whenever it needs a parameter. It receives a ParamData object which contains not only the parameter data but information about the parameter such as its maximum length and its datatype, as follows.

```
class ParamData
{
public:
    ParamData ();
    ParamData (CS_CHAR *, CS_BYTE *, CS_INT, CS_INT,
    CS_BOOL);
    virtual ~ParamData ();
    CS_BYTE         *getDataPointer (void);
    CS_CHAR         *getDescription (void);
    CS_DATAFMT      *getDataFmtPointer (void);
    CS_INT          *getDataLengthPointer (void);
    CS_BYTE         *getOutputParamPointer (void);
    char            *getName (void);
    CS_BOOL         isOutput (void);
    CS_BOOL         isNull (void);
    CS_INT          getIndex (void);
    CS_INT          getDataType (void);
    CS_INT          getDataLength (void);
    CS_INT          getMaxDataLength (void);
    CS_SMALLINT     getNullIndicator (void);
    CS_SMALLINT     *getNullIndpointer ();
    void            setIndex (CS_INT);
    void            setDescription (CS_CHAR *);
    void            setDataPointer (CS_BYTE *);
    void            setDataLength (CS_INT);
    CS_RETCODE      setElement (CS_CHAR *, CS_BYTE *,
                    CS_INT,
                            CS_INT, CS_BOOL);
private:
protected:
    CS_INT          paramIndex;
    CS_DATAFMT      dataFmt;
    CS_INT          dataLength;
    CS_BYTE         *dataBuf;
    CS_CHAR         description [CS_MAX_CHAR];
    CS_SMALLINT     nullIndicator;
};
```

The basic methodology for LangMarshaller::getAParam( ) may be summarized as follows.

```
LangMarshaller::getAparam(ParamData &pdata)
{
    paramindex++
    pdef = paramdefs[paramindex]
    ptype = pdef->getType()
    get next token in language buffer
    convert the token from string to ptype
    set pdata->type to ptype
    set pdata->data to converted data
    set other miscellaneous info in pdata
}
```

Various errors can occur during this process. For example, it may not be possible to convert the current token to the expected type, for instance, due to a type mismatch or a syntax error. Or, there may not be any more tokens even though one is expected.

Sending output params back to the client is much more straightforward. Both TDSMarshaller and LangMarshaller use existing Sybase® Open Server™ API calls (e.g., srv_descfmt( ), srv_bind( ), srv_xferdata( ) to do this in a straightforward manner.

3. Sending Results

A particular advantage of the MASP interface is that it truly does look like a database stored procedure. This includes the ability for a CTS method to send back tabular result sets as if these results came from a database table.

The CTS provides APIs in C, ActiveX and Java, that allow a component writer to describe, populate, and deliver tabular results to the client. These APIs, for the most part, map to an open interface, such as APIs in Sybase® Open Server™. There is minimal new code in Jaguar to make this work—most of it is mapping between the component's language and/or component model and Open Server.

By allowing CTS to look like a database and execute component methods as stored procedures, a wide range of existing, easy-to-use tools can immediately take advantage of CTS, using its remote stored procedure mechanism. Examples include Powerbuilder™, PowerJ™, PowerDynamo™, Microsoft VisualBasic, and Sybase® Adaptive Server Enterprise™.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system comprising a computer network having a database server and a client, a method for providing the client with component-based access to tabular data from the database server, the method comprising:

providing a component-based transaction server, said transaction server in communication with both the client and the database server;

registering the particular component with the transaction server so that the particular component is accessible across the network to the client, said particular component comprising a plurality of methods; and providing the client with component-based access to tabular data from the database server by:

(i) providing an interface allowing the client to request a tabular data set by invoking a particular method of the component; and (ii) upon receiving such a request from the client to retrieve data from the database server, processing said request by creating at the transaction server a result set satisfying said request and transmitting said result set to the client as a tabular data set.

2. The method of claim 1, wherein said client resides on a first tier, said transaction server resides on a second tier, and said database server resides on a third tier.

3. The method of claim 1, wherein said tabular data comprises a data set arranged in row-based format.

4. The method of claim 1, wherein said database server comprises a relational database management system (RDBMS).

5. The method of claim 1, wherein said particular component comprises a selected one of a Java component, a Java Bean component, an ActiveX component, and a C/C++ component.

6. The method of claim 1, wherein said interface comprises a database connectivity interface supporting compatibility with Java Database Connectivity (JDBC) protocol.

7. The method of claim 1, wherein said particular method of the component comprises a data access method.

8. The method of claim 1, wherein step (ii) includes transmitting from the database server to the transaction server a tabular result set satisfying said request.

9. The method of claim 8, wherein said tabular result set is transmitted from the database server to the transaction server as a result of a database query transmitted from the transaction server to the database server.

10. The method of claim 9, wherein said database query is formulated based on information sought by the client.

11. The method of claim 1, wherein step (i) further comprises:

creating a proxy allowing the transaction server to process a request from the client to retrieve data.

12. The method of claim 1, wherein said request is transmitted at least in part using HyperText Transport Protocol (HTTP).

13. The method of claim 1, wherein said transaction server and said database server communicate at least in part using a tabular data streaming protocol.

14. The method of claim 1, wherein said transaction server optionally satisfies said request by returning an object.

15. The method of claim 1, wherein said client includes a data aware control and wherein said method further comprises binding said tabular data set to the data aware control.

16. A system for providing a client with component-based access to tabular data from a database server, the system comprising:

a network connected to at least one database server and at least one client;

a transaction server connected to the network and in communication with both a particular client and a particular database server, said transaction server for providing the particular client with component-based access to tabular data from the particular database server; and a connectivity interface allowing the particular client to request a tabular data set by invoking a particular method of a component registered with the transaction server;

wherein upon receiving such a request from the particular client to retrieve data from the particular database server, the transaction server processes said request by retrieving from the particular database server a result set satisfying said request and transmitting said result set to the client as a tabular data set.

17. The system of claim 16, wherein said particular client resides on a first tier, said transaction server resides on a second tier, and said particular database server resides on a third tier.

18. The system of claim 16, wherein said tabular data comprises a data set arranged in row-based format.

19. The system of claim 16, wherein said particular database server comprises a relational database management system (RDBMS).

20. The system of claim 16, wherein the registered component comprises a selected one of a Java component, a Java Bean component, an ActiveX component, and a C/C++ component.

21. The system of claim 16, wherein said connectivity interface supports compatibility with Java Database Connectivity (JDBC) protocol.

22. The system of claim 16, wherein said particular method of the component comprises a data access method.

23. The system of claim 16, wherein transaction server processes said request, at least in part, by retrieving into a local buffer of the transaction server a tabular result set satisfying said request.

24. The system of claim 23, wherein said tabular result set is retrieved as a result of a database query transmitted from the transaction server to the database server.

25. The system of claim 24, wherein said database query is formulated based on information sought by the particular client.

26. The system of claim 16, wherein transaction server processes said request, at least in part, by creating a proxy allowing the transaction server to process a request from the particular client to retrieve data.

27. The system of claim 16, wherein said request is transmitted at least in part using HyperText Transport Protocol (HTTP).

28. The system of claim 16, wherein said transaction server and said database server communicate at least in part using a tabular data streaming protocol.

29. The system of claim 16, wherein said transaction server optionally satisfies said request by returning an object.

30. The system of claim 16, wherein said particular client includes a data aware control bound to said tabular data set.

31. The system of claim 16, wherein said network is connected to the Internet.

32. The system of claim 16, wherein said particular client comprises a Web-based client.

33. The system of claim 16, wherein said particular client comprises a Microsoft Windows-based client.

34. The system of claim 16, wherein the transaction server further processes said request by returning a database cursor.

35. The system of claim 34, wherein said database cursor comprises a Java Database Connectivity (JDBC) handle.

* * * * *